United States Patent [19]

Moore

[11] 4,183,226
[45] Jan. 15, 1980

[54] REFRIGERATED BEVERAGE HOLDER

[75] Inventor: Stanley R. Moore, Dallas, Tex.

[73] Assignee: Freeze Sleeves of America, Inc., Dallas, Tex.

[21] Appl. No.: 816,434

[22] Filed: Jul. 18, 1977

[51] Int. Cl.² .............................................. F25D 3/08
[52] U.S. Cl. ...................................... 62/457; 62/530
[58] Field of Search ................................. 62/457, 530

[56] References Cited

U.S. PATENT DOCUMENTS

| | | | |
|---|---|---|---|
| 2,438,643 | 3/1948 | Moore | 62/530 |
| 3,302,427 | 2/1967 | Stoner et al. | 62/457 |
| 3,302,428 | 2/1967 | Stoner et al. | 62/457 |
| 3,360,957 | 1/1968 | Paquin | 62/457 |
| 3,680,330 | 8/1972 | Canosa | 62/457 |
| 3,715,895 | 2/1973 | Devlin | 62/457 |
| 3,885,403 | 5/1975 | Spencer | 62/530 |

Primary Examiner—Ronald C. Capossela
Attorney, Agent, or Firm—Crisman & Moore

[57] ABSTRACT

Means for chilling and insulating a canned or bottled beverage such as beer including a cylindrical sleeve of reusable refrigerant disposed within an insulative beverage can holder and displacing the annular "dead air" cavity between a beverage can situated therein and the side walls of the holder. The reusable refrigerant is a substance which may be frozen in conventional refrigerator freezers whereby the refrigerant in a frozen state will chill and keep chilled beer or the like disposed therewithin. In this manner, a beverage may be quickly chilled whether initially refrigerated or not and while being consumed out of doors. Moreover, the chilled temperature is normally unachieveable in conventional refrigerators and is especially not maintainable for any length of time in conventional "dead-air" insulative holders.

4 Claims, 4 Drawing Figures

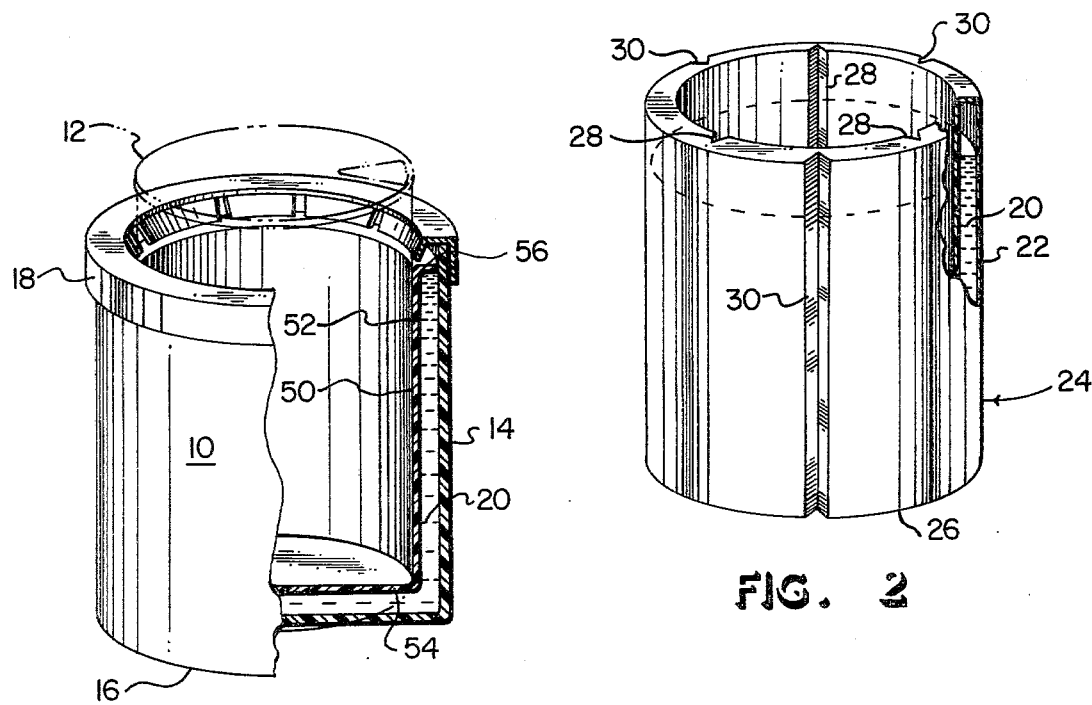
FIG. 1
FIG. 2
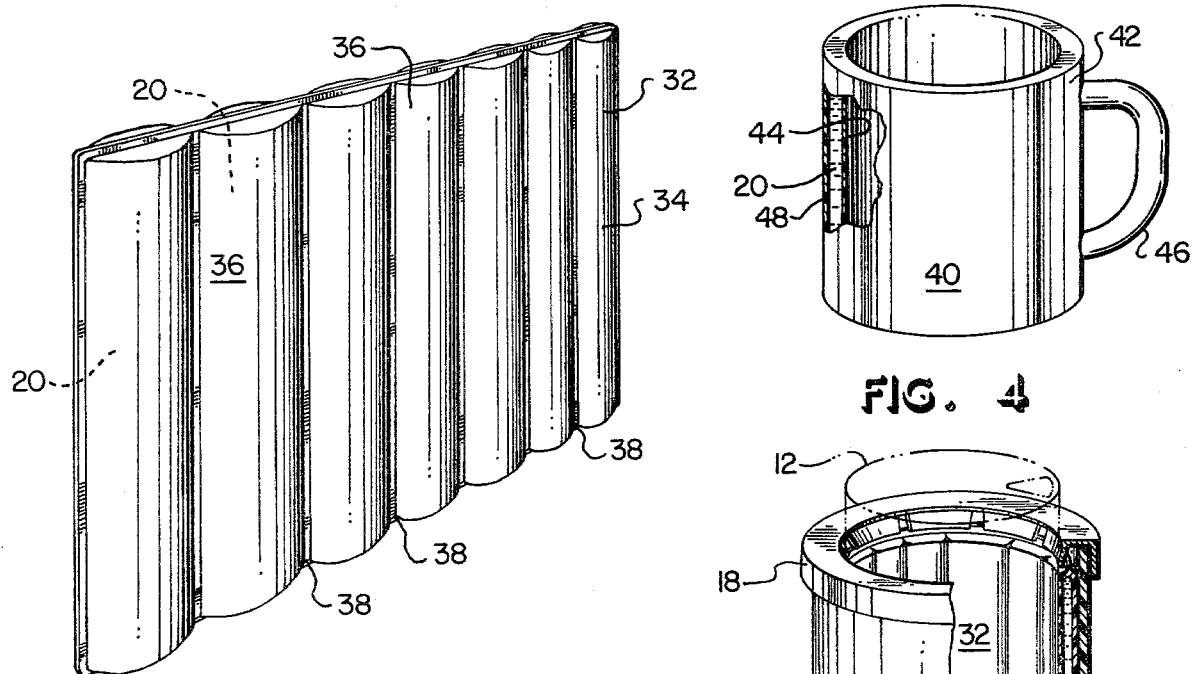
FIG. 3
FIG. 4
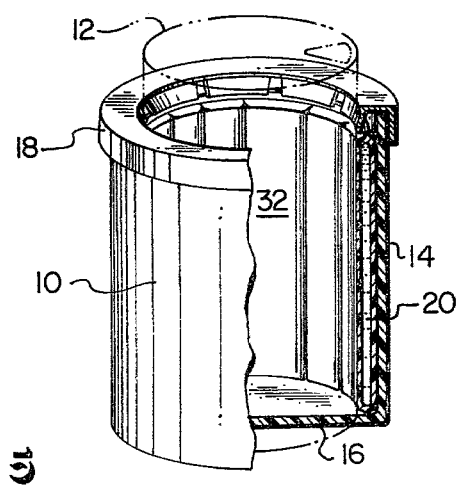
FIG. 5

REFRIGERATED BEVERAGE HOLDER

BACKGROUND OF THE INVENTION

The invention relates to a beverage holder, and, more particularly, to a beverage holder having a sleeve of reusable refrigerant disposed therein for circumferentially engaging and chilling a contained beverage.

It is conventionally desirable to consume beverages such as soft drinks and particularly beer in a chilled state. Such beverages are thus stored in refrigerated areas such as ice boxes or ice chests for sufficient periods of time prior to consumption to lower the temperature of the beverage and impart maximum thirst quenching effectiveness thereto. It is particularly desirable to consume chilled beverages out of doors when the environmental conditions include temperatures in, around and above that of the normal body temperature. In such circumstances perspiration is generally induced in the mammalian body. The release of fluid from the body in the form of evaporation helps cool and maintain the normal body temperature. The consumption of fluid such as soft drinks and beer is then integral to a normal body fluid level.

Beverages such as soft drinks are often emptied from their containers into glasses or cups filled with ice to afford maximum chilling during consumption. The taste of soft drinks is not adversely affected by the water produced by the melting ice. However, in the case of beer or ale, ice can not be added due to the watering effect and the undesirable taste resulting therefrom. For this reason beer is usually stored in refrigerators where the temperature is relatively low. Unfortunately conventional refrigerators are not generally kept at a temperature whereby the beverage is suitably chilled to a point near that of freezing. Unless the consumer wishes to place the beverage can or bottle in the refrigerator freezer to suitably chill it, a beverage such as beer is normally considered "cool" but not cold. But neither beer nor soft drinks can be left in the freezer unattended since both would eventually freeze. For this reason beer and many soft drinks are consumed directly from their containers in a less than desirable chilled state.

The desirability of consuming beverages in whatever chilled state is available has prompted the development of certain apparatus to insulate the chilled beverage containers from the environment during consumption thereof. One such device of contemporary popularity is a beverage can holder comprised of a suitable foam material molded into an insulative cup configuration suitable for receiving a beverage can therein. Usually a plastic lip is provided at the top of the insulative cup whereby the beverage can is disposed centrally therein with a dead air space therearound. The combination of the foam insulation characteristics and dead air space comprise a suitable means for maintaining the chilled condition of the beverage for some extended period of time. Such insulative cups, or beverage holders, are most popular out of doors where an uninsulated beverage will quickly absorb the heat of the environment.

Certain problems exist with the aforesaid prior art beverage holders. The beverage must initially be chilled. Once the beverage container is removed from its chilled environment it can only get warmer, and the insulated beverage container only retards this inevitable result. Aggravating the warming trend is the conventional beverage container material which is usually aluminum or glass. Such materials have a relatively high rate of thermal conductivity which operates to afford heat absorption into the beverage. Moreover, once a substantial portion of the beverage is consumed, the low temperature thermal volume of the remainder is disproportionate to the dead air space thermal volume. It would therefore be desirable to provide a beverage holder which could overcome the aforesaid porblems wherein a beverage could be consumed over an elongated period of time at a constant and desirably low temperature.

The refrigerated beverage holder of the present invention is especially adapted for intensively chilling and maintaining the chilled condition of the beverage before and during consumption. The present device overcomes many of the disadvantages of piror art insulative beverage holders by providing a medium therein which absorbs heat from the enclosed beverage rather than transferring heat thereto. In this manner the thermal conductivity properties of the beverage container are utilized to the advantage of chilled consumption and the beverage may actually be cooled below the temperature from which it was removed.

SUMMARY OF THE INVENTION

The invention relates to a beverage holder and/or container which includes refrigerant for cooling a beverage disposed therein. More particularly, one aspect of the invention involves an improved container for chilled beverages wherein the container is of the type including side walls and being adapted for holding the beverage therein. The improvement comprises a refrigerant, such as water disposed within the side walls of the container wherein the refrigerant is adapted for absorbing heat energy to secure a prolonged low temperature beverage condition. The refrigerant is of the type exhibiting a liquid state at temperatures above 40° F. and a solid state at relatively lower temperatures wherein the latent heat of fusion thereof permits advantageous absorptivity.

In one aspect the invention includes the refrigerant disposed within hollow walls of a mug wherein the beverage may be poured therein and consumed. In another aspect the invention includes the refrigerant disposed within the side walls of an insulated beverage container holder of the type conventionally used for canned beer. The refrigerant may be provided directly within the annular space between the beverage can and the insulated side walls of the holder. Similarly it may be provided within a refrigerant insert, or lining.

In yet another aspect the invention includes a method of refrigerating a canned beverage for consumption including pouring a liquid refrigerant into the annular region between the space provided for a beverage can and the side walls of an insulated can holder and permitting the liquid refrigerant to solidify. Once solidified the refrigerant is capable of absorbing latent heat and chilling a beverage subsequently disposed therein.

BRIEF DESCRIPTION OF THE DRAWINGS

For a more complete understanding of the present invention and for further objects and advantages thereof, reference may now be had to the following description taken in conjunction with the accompanying drawings, in which:

FIG. 1 is a perspective view of one embodiment of a refrigerated beverage holder constructed in accordance with the principles of the present invention and with a part thereof cut away to illustrate the construction thereof;

FIG. 2 is a perspective view of one embodiment of refrigerant lining for a beverage container holder constructed in accordance with the principles of the present invention;

FIG. 3 is a perspective view of an alternative embodiment of the refrigerant lining of FIG. 2; and FIG. 4 is a perspective view of an alternative embodiment of the refrigerated beverage holder of FIG. 1, further illustrating the principles of the present invention.

DETAILED DESCRIPTION

Referring first to FIG. 1, there is shown a perspective view of a prior art beverage can holder 10 with a beverage can 12 shown in phantom therein. The prior art holder 10 is generally formed with insulative walls 14 and a bottom 16 and constructed of a closed cell foam, or the like. A plastic lip 18 is provided atop holder for securing the beverage can 12 generally centrally therein. The inside diameter of the holder is usually greater than the diameter of the can 12 whereby an annulus of dead air is provided for further insulation. In this manner, the can 12 can be inserted into the holder 10 in a chilled condition for retarding the warming thereof during beverage consumption.

Still referring to FIG. 1, there is shown one embodiment of the present invention wherein a refrigerant 20 is disposed within the side walls of the beverage holder 10. The refrigerant 20 in this particular embodiment is provided within the dead air annulus of the holder 10 and circumferentially about the beverage can 12 illustrated therein. The refrigerant 20 may be water and/or a gel substance such as that conventionally available for hospitals and the like as reusable ice packs. The refrigerant gives off latent heat of fusion during solidification when exposed to sufficiently low temperatures such as the freezing compartment of conventional refrigerators. Once solidified, the refrigerant 20 is capable of absorbing heat from the beverage can 12 and/or the environment around the holder 10 while chilling and keeping a beverage, such as beer, in the can 12 desirably cold for consumption.

Referring now to FIG. 2, there is shown a perspective view of a refrigerant 20 disposed within a structurally rigid housing 22 to form a refrigerant lining 24 for a conventional holder 10. The lining 24 is formed of thin walled material such as plastic and may be slidably removable from the holder 10. The lining 24 preferably includes a bottom 26 of conformal shape to a particular beverage container whereby maximum chilling is achievable. Grooved wall slots 28 are also preferably provided for venting air into or out of the lining as the beverage container is inserted. Similarly, outer wall grooves 30 are preferably provided for facilitating insertion and removal of the lining 24 from the holder. In this manner, the lining 24 may be refrigerated into a frozen state independent of the beverage can and/or holder 10 or it may be refrigerated while disposed within said holder 10. It is also noted that the term beverage "can" as used herein refers to all forms of containers conventionally provided for soft drinks and beers such as aluminum and steel cans and glass bottles.

Referring now to FIG. 3, there is shown a perspective view of an alternative embodiment of a refrigerant lining including a housing 32 made of thin walled material 34 such as plastic or the like in a plurality of elongated sealed sections 36. Each section 36 is divided by a seam 38 and is preferably the length of a conventional holder 10 and no thicker than the width of the annular "dead air" space defined above. Refrigerant 20 is provided within each section 36 in a volume whereby the frozen condition thereof does not cause an increase in thickness beyond said "dead air" space. In this configuration, the housing 32 can be refrigerated and solidified either in a planar condition and then folded along seams 38 or inserted into said holder first and then refrigerated. The thin walled material may either be flaccid or semi-rigid since a fluid pressure of air and refrigerant may be achieved within each sealed section 36 to impart the requisite degree of rigidity thereto. Similarly, sufficient air is provided within each sealed section 36, and/or housing 22, to accommodate refrigerant expansion during freezing. It may be noted that in this particular embodiment the necessary freezer space in a refrigerator for solidifying the refrigerant 20 may be minimized whereby more refrigerant linings can be stored than in the other configurations shown herein.

Referring now to FIG. 4, there is shown an alternative embodiment of the refrigerated beverage holder of FIG. 1. In this particular embodiment a structurally rigid housing 40 is provided in the configuration of a drinking vessel, or mug 42 with refrigerant 20 disposed therein. The mug 42 is comprised of inner walls 44 adapted for holding a consumable beverage and thermally communicating the beverage with the refrigerant 20 therebehind. A handle 46 is provided upon outer walls 48 which may be insulated to reduce energy loss. In this manner beverage may be poured into drinking vessels which assure a chilled condition thereof without providing ice therein.

Referring once again to FIG. 1, it may be seen that the refrigerant 20 disposed therein is also contained by a housing 50. The configuration of housing 50 includes inner walls 52 sealably connected by a bottom 54 and a lip 56 circumferentially encompassing the top thereof. The lip 56 is sealably affixed to the holder 10 along the top edge thereof, therein providing an enclosed environment for refrigerant 20 between housing walls 52 and holder walls 14. Sufficient air space is of course provided for expansion of the refrigerant as in the other configurations. This particular embodiment is particularly adapted for use with a holder 10 whereby manufacture may be greatly facilitated with the simple construction thereof. Unlike housing 22 of FIG. 2, however, the housing 50 is not freely insertable into the holder 10 since it is affixed thereto along upper lip 56.

The method of practicing the present invention as illustrated in the above referenced drawings includes pouring a refrigerant 20, such as water, in a liquid state into the annular space around a beverage container and/or a housing constructed for such a purpose, and subsequently storing the liquid refrigerant in a freezing environment. When no refrigerant housing is utilized, the liquid refrigerant may be poured around an empty beverage can 12 which may be subsequently removed and replaced with the beverage to be chilled. The freezing compartment of conventional refrigerators have been shown to be satisfactory when utilizing a refrigerant which solidifies around 32° F. In this manner the frozen refrigerant 20 may be disposed adjacent the beverage container 12, in thermal communication therewith, for intensively chilling the beverage and maintaining the low temperature thereof.

For purpose of example only it has been shown that the positioning of a simple refrigerant 20 comprised of water in layers of ⅛ inch to 3/16 inch around conventional soft drink and beer cans of 12 ounce volumes having a diameter on the order of 2½ inches has effectively chilled the contained beverage from a room temperature to a consumable temperature in less than eight minutes. However, with such an elevated initial beverage temperature the chilling intensity and duration is much less than for beverages initially chilled in a refrigerator. With initially refrigerated beverages the chilling intensity is maximized and the duration greatly extended in that the frozen refrigerant 20 absorbs its latent heat of fusion at a retarded rate and little energy is wasted in lowering the beverage temperature through the expanded range between room and a chilled state. Similarly it may be seen that conventional beverage holders 10 may be expanded slightly to afford a thicker configuration of refrigerant 20 and a greater cooling capacity for beverages placed therein. The chilling capacity of such refrigerant linings for any given temperature range of a beverage is calculable by conventional engineering relationships. In this manner, it is possible to provide refrigerant linings particularly adapted for intensively chilling unrefrigerated beverages for immediate consumption by thermally communicating the beverage with a sufficient volume of refrigerant 20.

It is believed that the operation and construction of the above described invention will be apparent from the foregoing description. While the refrigerated beverage holder shown and described has been characterized as being preferred, it will be obvious that various changes and modifications may be made without departing form the spirit and scope of the invention as defined in the following claims.

What is claimed is:

1. A structure for holding a beverage container and chilling the contents during consumption, comprising:
   a cylindrical cup closed at one end and open at the other for receiving a beverage container, said cup being slightly greater in diameter than a beverage container to be received;
   a broad, relatively thin walled bag having a seal around its edges;
   a freezable fluid filling said sealed thin walled bag;
   a plurality of transverse seams between opposing walls of said bag, said seams extending parallel to one another and each transverse seam intersecting an edge seam at each and thereof to form said bag into a plurality of elongate sealed sections, said bag being folded along transverse seams into a cylindrical configuration and received into said cylindrical cup to conform to the outside walls of a beverage container placed into the cup for chilling of the beverage when said fluid is frozen.

2. A refrigerant structure adapted for chilling a beverage container during consumption as set forth in claim 1 wherein said freezable fluid comprises a water based gel material.

3. A refrigerant structure adapted for chilling a beverage container during consumption as set forth in claim 1, wherein said cylindrical cup is formed of a closed cell foam material.

4. A refrigerant structure adapted for chilling a beverage container during consumption as set forth in claim 3 wherein said structure also includes an annular ring seated to the upper open end of the cylindrical cup.

* * * * *